Feb. 1, 1966  LE ROY S. HARRIS  3,232,109
BEARING MOUNT IN A FLOWMETER
Filed March 26, 1963

INVENTOR:
LEROY S. HARRIS
BY Howson & Howson
ATTYS.

United States Patent Office 3,232,109
Patented Feb. 1, 1966

3,232,109
BEARING MOUNT IN A FLOWMETER
Le Roy S. Harris, Huntingdon Valley, Pa., assignor to Schutte and Koerting Company, Cornwells Heights, Pa., a corporation of Pennsylvania
Filed Mar. 26, 1963, Ser. No. 267,972
1 Claim. (Cl. 73—209)

The present invention relates to a new and improved bearing mount for supporting, for example, a movable element of a device, such as a measuring instrument.

The present invention is described in connection with and has useful application in a measuring instrument, such as a rotameter which, as shown in the drawing, comprises a flow tube, a magnetized float mounted for axial movement in the flow tube in response to the velocity of fluid pasing through the flow tube, and a spiral follower bar mounted adjacent the flow tube for pivotal movement along a predetermined arcuate path. The follower bar forms with the float a magnetic coupling whereby axial displacement of the float due to changes in the rate of flow of fluid through the flow tube effects pivotal movement of the follower bar. Recording means may be operatively connected to the follower bar to record the rate of flow of the fluid through the tube. The follower bar is usually carried by an elongated support member which in turn is journalled at opposite ends in miniature ball bearing or jewel bearing assemblies.

In some rotameters the size of the magnet which can be carried by the float is limited and thus the amount of magnetic strength available for moving the spiral follower bar is limited so that it is essential to mount the follower bar in bearings having low starting torque to insure responsive movement thereof. Additionally, it is essential that the bearing assemblies and support for the follower bar are aligned precisely so that the forces resisting movement of the follower bar are small to allow free movement thereof and minimize hysteresis or lagging.

However, measuring instruments such as rotameters are subjected to shock vibration and/or temperature variations during use, for example, due to rapid changes in the flow of fluid and/or extreme temperature changes of the fluid. It has been found that these conditions have resulted in binding, misalignment and/or malfunctioning of the comparatively sensitive miniature ball or jewel bearing assemblies, thereby setting up friction forces of a magnitude to bind or retard responsive movement of the follower bar, thus necessitating realignment or replacement of the bearings.

In accordance with the present invention, a bearing mount is provided for supporting a movable element of a measuring instrument, such as the spiral follower bar of a rotameter, which is characterized by novel features of construction and arrangement providing a rugged, low friction support for the follower arm capable of withstanding shock, vibration and/or temperature variations whereby the measuring instrument is characterized by extreme accuracy. To this end, the lower end of the elongated support for the follower bar is provided with a member having a spherical bearing surface which seats on and centrally of a plurality of spherical roller elements arranged in a circular array and the upper end of the elongated support member is journalled in a radial bearing assembly in a manner to permit limited axial movement to allow for thermal expansion. By this arrangement, the weight of the follower bar assembly is supported on all of the roller elements in the circular array, there being a point contact between the spherical member and the roller elements, thereby providing an extremely low friction support. Moreover, the low friction conditions apply even if the parts are slightly misaligned providing for easier assembly of the parts of the unit. It has been found that this bearing mount provides a rugged support for the follower arm whereby the low friction support for the follower arm is not affected by normal handling, pipe line shock or temperature variations so that the follower bar is extremely sensitive to displacement of the float thereby eliminating hysteresis, lagging and overtravel whereby the recorded response of the follower arm is an accurate indication of the flow rate of fluid through the flow tube and the instrument is characterized by extreme accuracy.

With the foregoing in mind, an object of the present invention is to provide an improved bearing mount for supporting a movable element of a measuring instrument characterized by novel features of construction and arrangement providing an extremely low friction support for the movable element notwithstanding normal shock and temperature variations to which the instruments may be subjected whereby the instrument is characterized by extreme accuracy.

Another object of the present invention is to provide a bearing mount for a rotameter which provides a rugged, low friction support for the follower bar even when the parts of the follower bar assembly are slightly misaligned for example, due to shock or vibration and which allows for thermal changes in the assembly.

A further object of the present invention is to provide a bearing mount providing a low friction support for the movable element of a measuring instrument capable of effectively withstanding shock, vibration and temperature variations over an extended period of use of the instrument thereby minimizing repair and replacement costs.

Still a further object of the present invention is to provide a bearing mount of comparatively simplified construction which is relatively inexpensive whereby the instrument may be manufactured economically.

These and other objects of the present invention and various features and details of the construction and operation thereof are hereinafter more fully set forth with reference to the drawings, in which.

Figure 1:
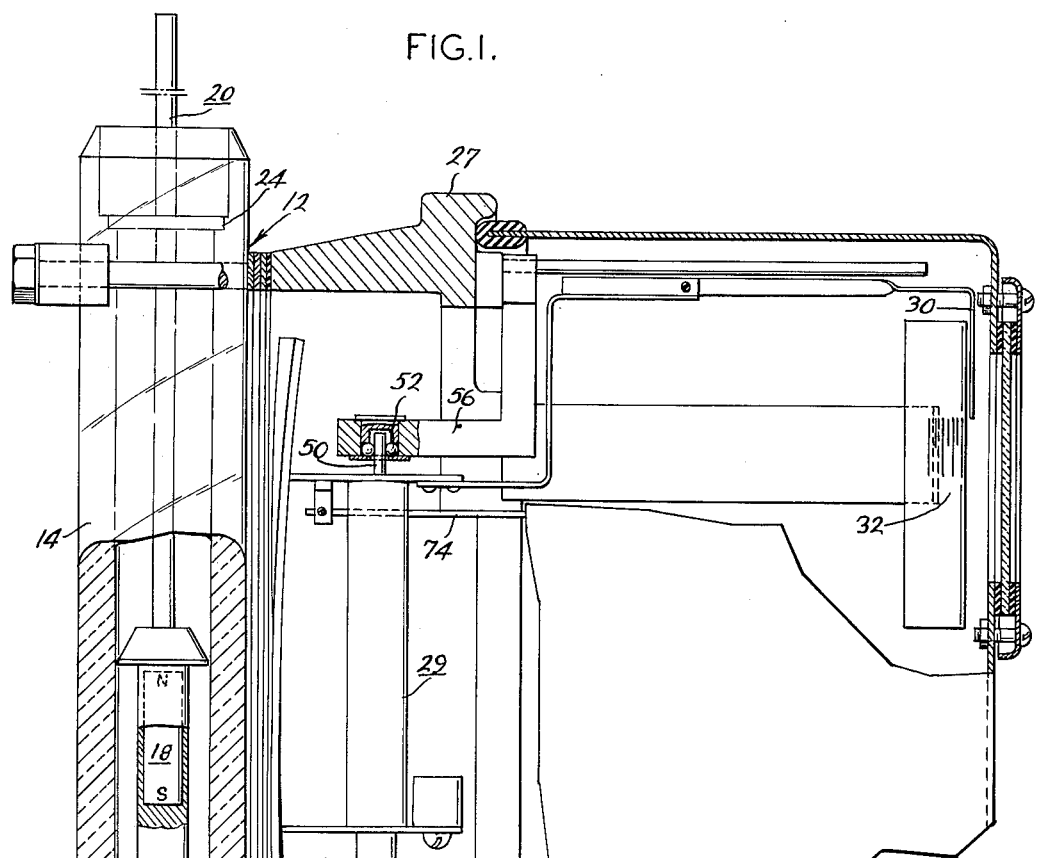
FIG. 1 is a fragmentary side elevational view partly in section of a rotameter embodying the present invention.

Referring now to the drawings, there is shown in FIG. 1 a bearing mount in accordance with the present invention for supporting, in the present instance, the follower bar 10 of a rotameter 12. As illustrated, the rotameter 12 which is of conventional construction comprises a generally cylindrical hollow flow tube 14 made of metal, glass or transparent plastic and a rotor or float 16 which mounts therein a bar magnet 18 having the polarity indicated. The rotor 16 is supported on a rod 20 which is slidably mounted in the hub portion 22 of spider support members 24, 24 at opposite axial ends of the flow tube 14. The rod 20 mounts a pair of spaced apart discs 26 adapted to abut the hub 22 of one of the spiders 24 to limit axial movement of the rotor 16 in the tube 14. The follower bar 10 is mounted for pivotal movement along a predetermined arcuate path and to this end is carried by a cylindrical support member 29 pivotally mounted in the housing 27 adjacent the wall of the flow tube 14. By this arrangement, when the rotor 16 is displaced axially in the flow tube 14 in response to fluid flow through the tube, a pivotal movement of the follower bar 10 is effected, which pivotal movement causes an indicator or pointer 30 connected to the follower bar 10 to traverse a graduated scale 32 whereby the flow rate of fluid through the tube 14 may be measured.

In accordance with the present invention, a bearing mount is provided for supporting the follower bar 10 having novel features of construction and arrangement providing a low friction support for the follower bar even when the instrument is subjected to repeated vibration and/or temperature changes whereby highly accurate readings of the instrument are assured. To this end, the bearing mount comprises a member 40 having a spherical contact surface which is mounted at the lower end of an extension 42 of the support 29 and which is disposed centrally of and seats on a plurality of spherical roller elements 44 arranged in a circular array in a support housing 46. As illustrated, the member 40 which in the present instance is semi-spherical is of a greater diameter than each of the spherical roller elements 44. In the present instance the upper end of the follower arm support 29 mounts a stub shaft 50 received in a thrust bearing assembly 52 housed in an arm or bracket 56 connected to the housing 27. All of the roller elements 44 are of a predetermined uniform size and the roller elements 44 and spherical surface of the member 40 are ground to a highly polished finish.

By this arrangement, the semi-spherical member 40 rests on all of the roller elements 44 to provide precise support for the follower arm 10 even if some of the parts of the support assembly for the follower arm are misaligned. Additionally, the distribution of the load of the follower arm support 29 is transmitted through the semi-spherical member 40 to all of the roller elements 44 and the point contact provided therebetween provides an extremely low friction support to minimize the effect of hysteresis. It has been found that the bearing mount is capable of effectively withstanding fluid flow pipe line and normal handling shock and vibration thereby enhancing the reliability of the instrument. Moreover, the bearing mount is extremely economical to manufacture and easy to assemble.

Figure 2:
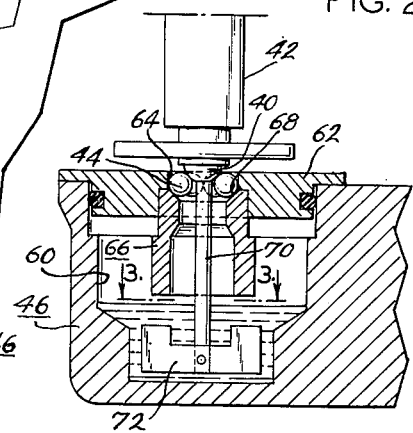
FIG. 2 is an enlarged sectional view of a bearing mount for the follower bar in accordance with the present invention.
Figure 3:
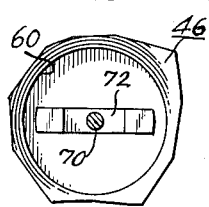
FIG. 3 is a sectional view taken on line 3—3 of FIG. 2.

As illustrated in FIG. 2, the housing 46 includes a cavity 60 forming a reservoir for fluid, a top cover 62 over the open end of the cavity having a central circular opening 64 which mounts therein a depending hollow sleeve 66. The sleeve 66 has in the present instance a conical tapered axial end face 68 providing a seat for the roller elements 44.

In order to damp pivotal movement of the follower bar 10, for example, when the float 16 is moved a large increment suddenly, the semi-spherical member 40 mounts a depending shaft 70 which extends through the opening 64 in the top cover 62 of the housing 46 and the sleeve 66 and which mounts at its outer free end a vane 72 submerged in the fluid in the reservoir 60. This dash pot arrangement minimizes overtravel of the follower bar 10 for sudden, comparatively large displacement of the float or rotor 16.

If desired, movements of the follower bar 10 may be employed to transmit a signal to a gauge, indicator, recorder, controller or the like to indicate, record, or control other elements in a system. To this end, suitable linkage means including a link 74 may be connected at one end to the follower bar 10 and at its opposite end to an electronic or pneumatic transducer (not shown) in the housing operable to sense movement of the follower bar 10 and transmit a signal to the gauge, indicator, recorder, controller or the like.

Even though the bearing mount of the present invention is shown and described in connection with a rotameter, it is of course to be understood that it has many other useful applications, especially in measuring instruments having movable elements where precision support for the movable element is required.

While a particular embodiment of the present invention has been illustrated and described herein, it is not intended to limit the invention and changes and modifications may be made therein within the scope of the following claim.

I claim:

In combination, a rotameter including a flow tube, a magnetized float movable axially in the flow tube, a spiral follower bar forming a magnetic coupling with the float, and a bearing mount for mounting said follower bar for pivotal movement along a predetermined arcuate path comprising an elongated upright support member carrying said follower bar, a support housing having a cavity therein forming a reservoir for fluid, a top cover over the open end of the cavity having a central circular opening, a hollow sleeve depending from said circular opening, said sleeve having a conical tapered axial end face defining a seat, a plurality of spherical roller elements arranged in circular array supported on said conical seat, a member having a spherical surface at the lower end of said support member adapted to seat on said roller elements centrally of the circular array, a ball bearing assembly surrounding said upper end of said support member in a manner to permit axial displacement thereof thereby allowing for thermal expansion of said support, a shaft depending from said spherical bearing surface, a vane mounted on said shaft and submerged in the fluid in said reservoir operable to damp movement of the support member and follower bar.

References Cited by the Examiner

UNITED STATES PATENTS

| 1,340,337 | 5/1920 | Heath. |
| 2,243,252 | 5/1941 | Huxford et al. _____ 73—202 X |
| 2,260,516 | 10/1941 | Gerber. |
| 2,867,113 | 1/1959 | Mims _____ 73—9 |

FOREIGN PATENTS

| 506,521 | 5/1929 | Germany. |
| 1,054,246 | 4/1959 | Germany. |

RICHARD C. QUEISSER, *Primary Examiner.*

DAVID SCHONBERG, *Examiner.*